Nov. 8, 1966 C. W. OJA ETAL 3,283,732
LIFTING AND CONTROL MEANS
Original Filed July 2, 1964 3 Sheets-Sheet 1

INVENTORS
CARL W. OJA
RICHARD L. SCHEUERMAN
BY Robert C Baker
ATTORNEY

Nov. 8, 1966  C. W. OJA ETAL  3,283,732
LIFTING AND CONTROL MEANS
Original Filed July 2, 1964  3 Sheets-Sheet 2
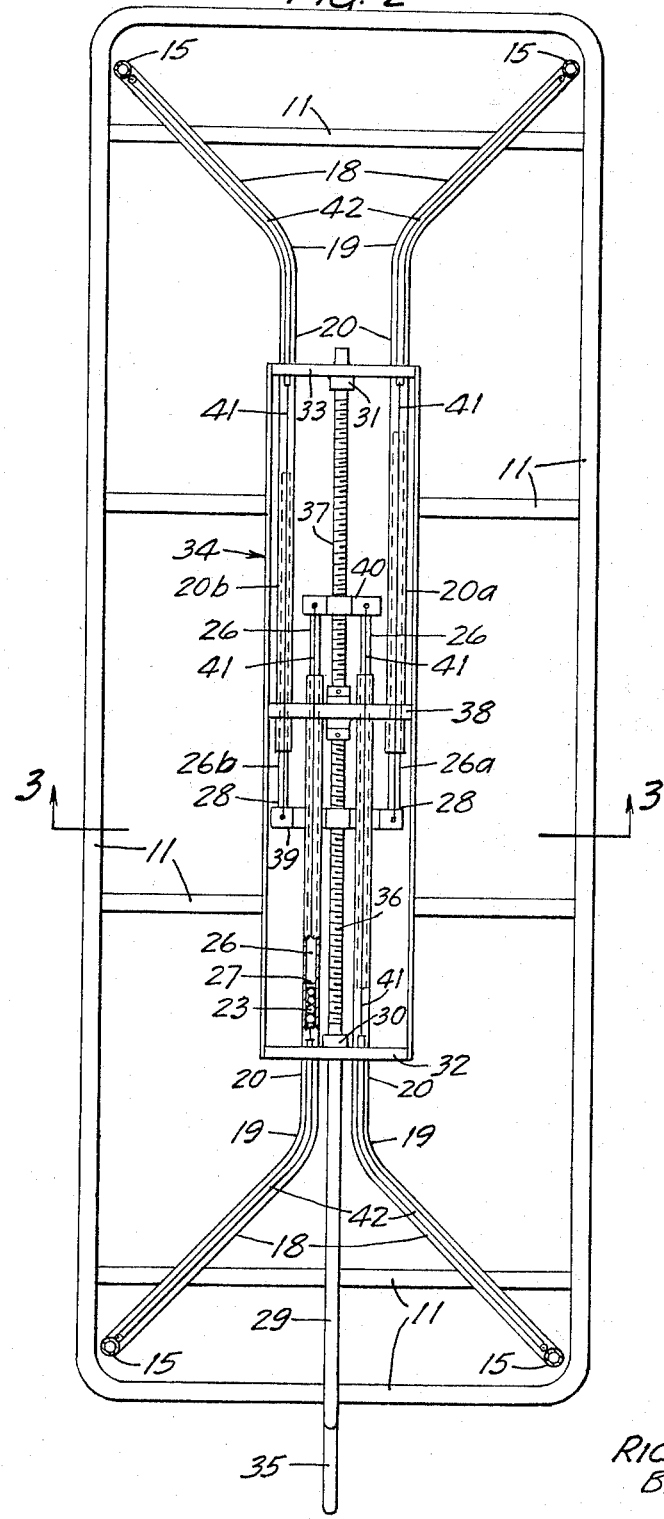
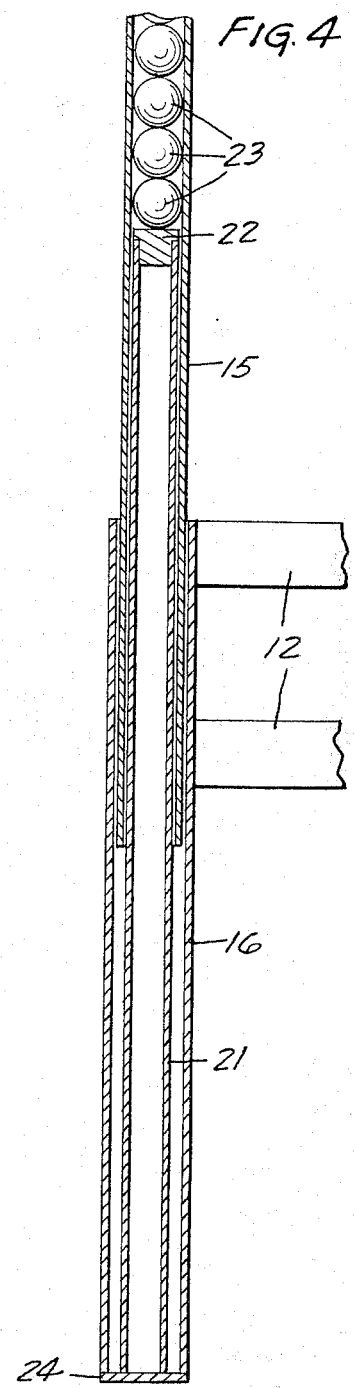
INVENTORS
CARL W. OJA
RICHARD L. SCHEUERMAN
BY Robert C. Baker
ATTORNEY

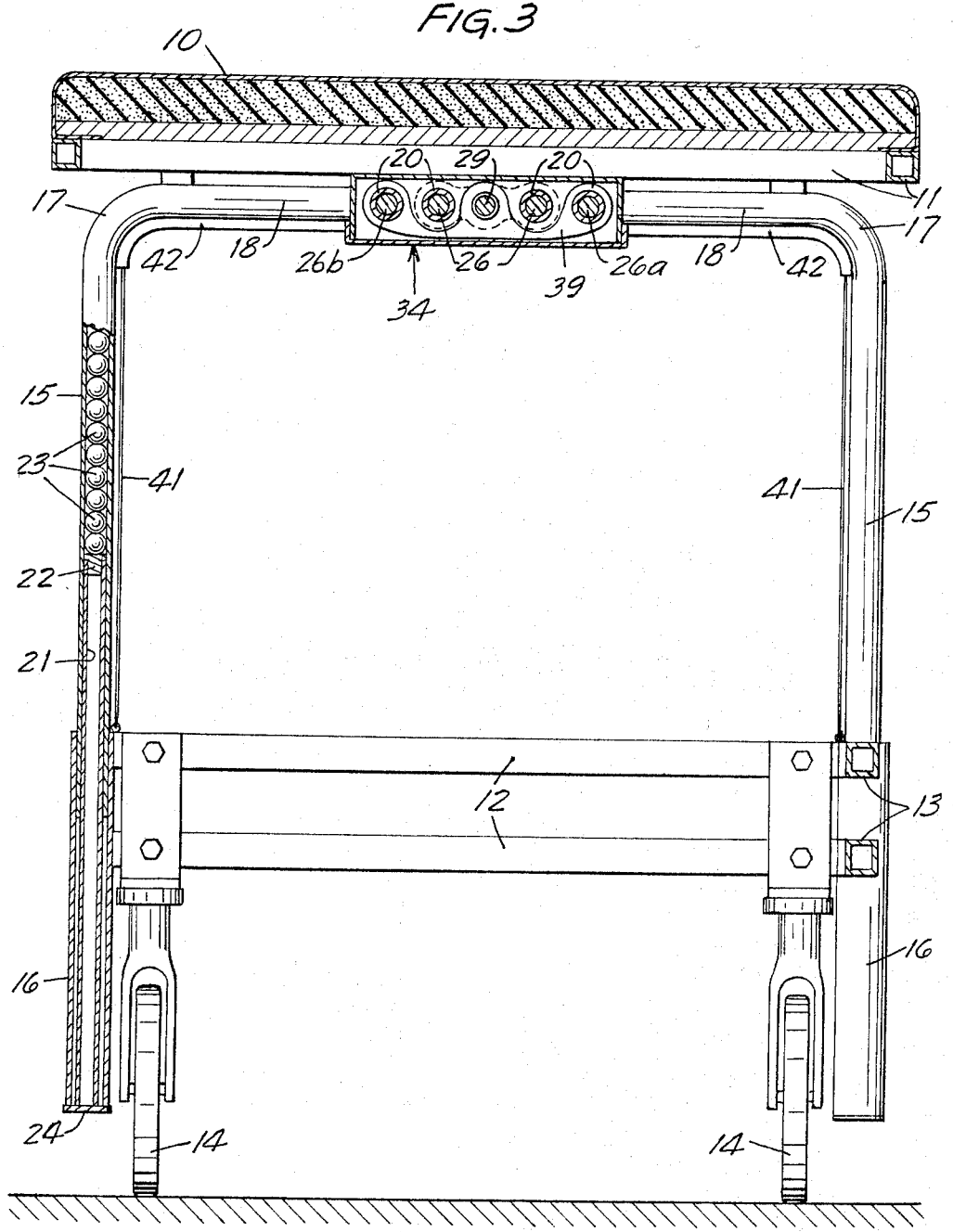

United States Patent Office 3,283,732
Patented Nov. 8, 1966

3,283,732
LIFTING AND CONTROL MEANS
Carl W. Oja, 2186 Marshall Ave., St. Paul, Minn., and Richard L. Scheuerman, Inver Grove, Minn.; said Scheuerman assignor to said Oja
Continuation of application Ser. No. 379,789, July 2, 1964. This application Oct. 24, 1965, Ser. No. 511,559
12 Claims. (Cl. 108—147)

This application is a continuation of our application Serial No. 379,789, filed July 2, 1964, now abandoned.

This invention relates to a smooth-operating rotatable-ball-containing control device for adjusting the position of an object with respect to a base frame while maintaining the object unified with the base frame. More particularly, the invention is directed to articles of manufacture such as beds, carriage-supported stretchers, chairs, tables and other platform-containing structures having the smooth-operating control device described hereinafter as a part thereof.

Rotatable-ball-containing devices for adjusting the position of an object with respect to a base frame are known. For example, it has been known to employ, as part of a base frame, a tubular member filled with rotatable balls movable therethrough under pressure as applied by a screw-operated abutting member projecting through slots in one end-section of the tubular member, thus causing a plunger in the other end-section of the tubular member to be elevated and to, in turn, elevate a platform supported by the plunger (see Wiesmann U.S. Patent No. 2,017,300). Such known devices are relatively cumbersome to build with economy. If the slotted portion of the tubular element is not formed of a rather heavy thickness of tubular metal, it tends to expand under the pressure exerted upon the balls therewithin. By employing blocks (with bearing-recesses) as spacers between the balls within the tubular element, the tendency for the slotted tubular element to expand under the pressure exerted upon the balls therewithin is reduced; but the expense of fabrication of the device is considerably increased. Further, relatively free rotation of balls within the tubular element is hampered by the presence of spacing blocks since the blocks increase the area of frictional contact on the balls and thereby increase the forces needed for rotation of the balls and operation of the device. Nothing unites the adjustable platform of such devices to the base frame thereof; and while the expedient of connecting a cable to the plunger for the platform and passing it directly through balls and spacing blocks within the tubular element to a connection on the screw-operated abutting member might be employed as a means to unify the platform with its base frame, such a solution not only presents fabrication problems and commensurate increased expense but also interferes with smooth and easy operation of the device in that it prevents effective rotation of the balls within the tubular element during adjustment of the device.

Lack of unification between the platform and the base frame of known devices of the foregoing type renders them impractical for use in apparatus which periodically must be lifted and moved, such as hospital equipment, particularly rehabilitation equipment including beds, stretchers, chairs and the like. Such equipment is not only moved within a hospital or other patient facility, but is periodically lifted and transported to different locations depending upon the needs of individuals undergoing rehabilitation. It most ideally is light in weight, simplified and "unified" in design, and reliable and smooth in operation—something akin or approaching "effortless" manual operation to gain adjustments of level being very much desired.

In essence, the desired combination of advantageous and practical features for the devices of interest is: (1) a unified platform and base frame, (2) safe, smooth, clean and reliable adjustability accomplished with little manual effort, (3) simplicity of design together with ease of cleaning, (4) economy of fabrication or manufacture, and (5) minimal problems of maintenance. Such a combination has been long sought for adjustable rehabilitation equipment and now is made possible, for the first time insofar as we are aware, by utilizing the teachings of this invention.

An important feature of the invention is the manner in which a plurality of leg sections (e.g., two or more leg sections) of a platform, or supported structure of equivalent character in terms of the teaching hereof, may be "expanded" or "contacted" (i.e., may cause the platform to be elevated or lowered) essentially uniformly, with great ease, and without apparent mechanical or hydraulic action. Apparatus having the control device of this invention as a part thereof does not shift significantly in position as a result of jostling or bumping of the apparatus, whereas screw-elevated platforms of the prior art have been known to shift in position under similar conditions. No oil leakage or comparable hydraulic problems are encountered when using apparatus of this invention.

Conveniently elevated and lowered stretchers and beds, believed to be entirely new in their adjustability characteristics and more simple in design than heretofore recognized, are now for the first time made possible.

Additional advantages and benefits of the invention will become evident as this description proceeds; however, it should be emphasized that the most preferred and practical benefits are gained when the control apparatus employed includes the special simplified and economical elements, with the relationships therebetween, as specifically illustrated hereinafter. Nevertheless, the invention is to be recognized as broader than the specific preferred apparatus hereof, but within the spirit and comprehension of the claims. Further, it should be noted that motorized operation of the control device hereof is possible without departing from the invention (even though manual operation is considered so easily accomplished for the preferred apparatus as to render motorized operation unnecessary).

The invention will be described by reference to a drawing made a part hereof wherein:

FIGURE 2 is a schematic sectional view, taken on line 2—2 of FIGURE 1, showing the underside of the stretcher platform in plan elevation (with the control box cover removed and with a small part of one tubular member broken away);

FIGURE 3 is a schematic transverse sectional view, taken on line 3—3 of FIGURE 1 (and, in part, 3—3 of FIGURE 2), showing the platform in elevated condition and showing one tubular member and associated elements in broken section;

FIGURE 4 is a schematic sectional enlargement of the tubular member and associated elements shown in broken section in FIGURE 3.

Figure 1:
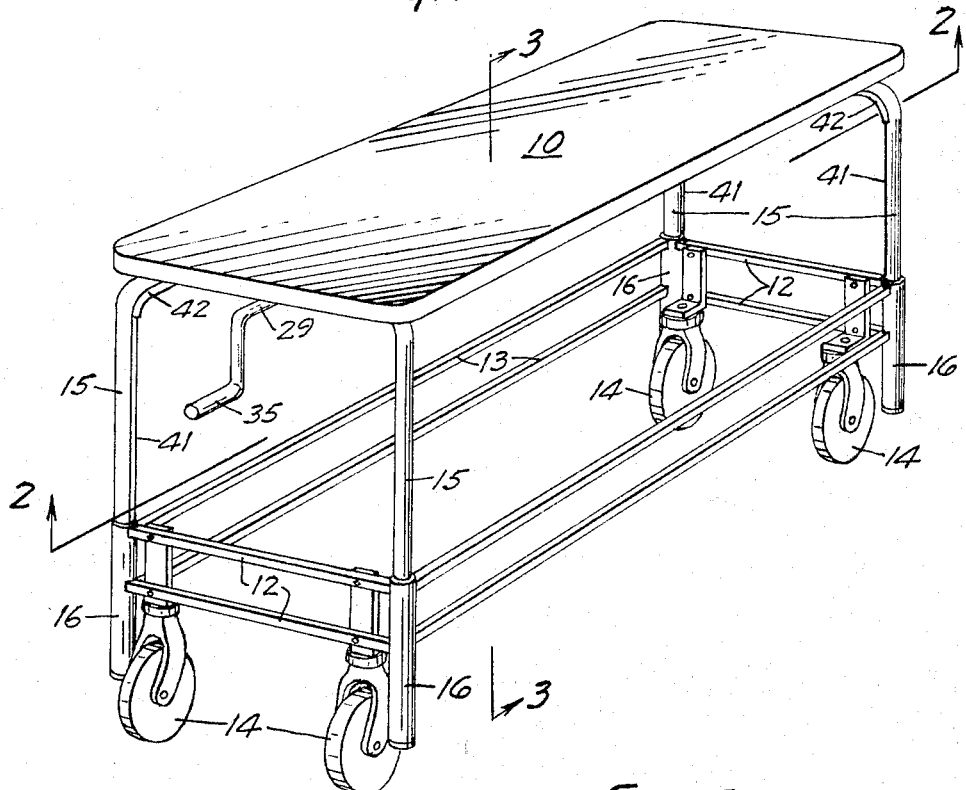
FIGURE 1 is a diagrammatic perspective view of a stretcher formed to have the features of this invention.

Referring to FIGURES 1, 2 and 3, the stretcher hereof has a platform structure 10, appropriately provided with braces or reinforcing elements 11, and a base frame structure 12 likewise provided with appropriate braces or reinforcing members or elements 13. Base frame 12 may be equipped with wheels or casters 14 (preferably recessed inwardly of legs 15) to provide for mobility, and is so equipped in the case of a mobile stretcher.

In the case of the stretcher illustrated, four straight tubular sections 15 (which may be considerably shorter than illustrated in FIGURES 1 and 3), one located approximately at each corner of the stretcher platform, are supported or mounted on the platform 10 and depend from the platform 10 toward the base frame 12. They meet and cooperate with tube-receiving sections or shells 16, four in number, supported or mounted on base frame 12.

Connected to the upper reaches of each straight tubular section 15 is a curved tubular section 17 having an internal diameter substantially the same as the internal diameter of the upper reaches of the connecting straight tubular section 15. Curved sections 17 are each in turn connected, illustratively through intermediate straight tubular section 18 and adaptor curved tubular section 19 (as illustrated in FIGURE 2), to straight plunger-receiving tubular sections 20.

The tubular member made up of sections numbered 15, 17, 18, 19 and 20 is sometimes referred to hereinafter as a "tubular first member" or "main tubular member." Preferably, it is essentially uniform in internal diameter throughout its entire length. It is necessary that it be of essentially uniform internal diameter in the portion of each section required to receive and allow rotation for ball elements, as will be discussed below. Thus, the internal diameter of each curved section of the main tubular member, as well as each section of that tubular member adjacent each end of such curved section (for a distance at least equal to the change of elevation contemplated for the platform), is essentially the same. In practice, careful bending of thin gauge tubes of steel or aluminum or other metal (e.g., tubes one inch in outer diameter and ⅞ inch in internal diameter) is suitably accomplished to gain curved tubular sections and to preserve an essentially uniform internal diameter as required.

Each of the main tubular members is open (or not plugged) at both ends. Each has at least one curved portion or section (e.g., as numbered 17 in the drawing) located intermediate a straight leg section 15 at one end and a straight plunger-receiving section 20 at the other end thereof. Preferably, the curvature of the curved portion is essentially 90° in its effect, such that the plunger-receiving section 20 is essentially in a horizontal plane perpendicular to an essentially vertical leg section 15.

Each straight leg section 15—as particularly illustrated in FIGURE 4—receives slidably within it, in telescoping (non-screw) fashion, a straight stem member 21 having a solid end cap or plug 22. Preferably the straight stem member 21 is a tube or pipe, hollow in its interior to reduce weight while maintaining stem strength; and its outer diameter is preferably just sufficiently less than the inner essentially-smooth nonthreaded diameter of the straight leg section of the main tubular member to allow for free longitudinal sliding movement between the surfaces thereof without binding.

Against solid internal end 22 abuts one of the solid balls of an aligned series of solid balls 23 within the main tubular member. Each ball is of a diameter just sufficiently smaller than the internal diameter of the main tubular element to avoid binding during movement of the balls with respect to the surface of the internal bore or chamber of the tube member. The balls 23 are so large that they remain in constant unchanged and non-sticking alignment within the tubular member during operation of the device. They are not engaged with or by gears or gear teeth for any purpose. They are aligned in tangential contact with each other without spacers or the like therebetween, and with all the points of tangential contact lying in a smooth (or essentially smooth) imaginary line as distinguished from an imaginary wavy or jagged line through the tubular member.

The relative positional relationship between the straight stem member 21 and the end solid ball 23 in abutting contact with the solid end 22 of the stem is also essentially constant during adjustment of the device. On the other hand, straight leg section 15 will be found to vary in degree of its envelopment of stem member 21 (i.e., stem member 21 will vary in its degree of telescoping within leg section 15) depending on adjustments made using the control device hereof. As greater distance between the base member and the platform is created using the adjusting device hereof, a greater and greater portion of stem member 21 extends or projects from the open end of the straight leg section 15 of the main tubular member; but the projecting portion of stem 21 is not exposed. It is within shell 16, which serves a protective purpose as well as a structural function.

Figure 5:
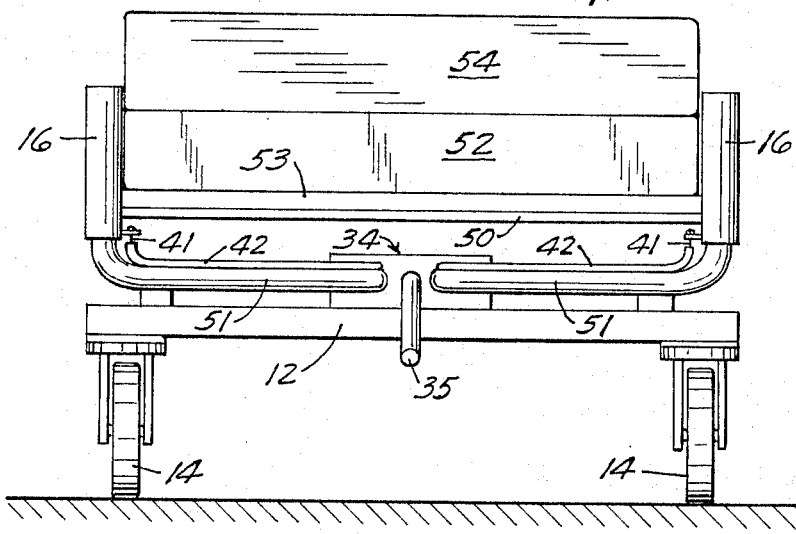
FIGURE 5 is a diagrammatic end plan view of an adjustable bed embodiment of this invention.

Experiments have shown that balls 23 must be greased to facilitate their rotation during adjustment of the device, thereby to gain easy manual operation. Greasing also gives or provides for silent or quiet adjustability. But greasing causes a grease film to form gradually over the inner or internal surface of leg section 15 of the main tubular member and over the exterior surface of the straight stem member 21 as a result of adjustment made using the device. Shell 16 serves the advantageous function of preventing contact with any grease on the outer surface of stem 21 during expanded condition of the control device. Shell 16 has an internal diameter in excess of the external diameter of the straight leg section 15 of the main tubular member, and receives and maintains the extremity or end of the straight leg section 15 of the main tubular member therewithin during all practical extremes of adjustment of the device. It is interesting here to observe that the length of sleeve or shell 16 is less than the length of straight stem member 21, and that the greatest extreme of expansion of the apparatus from a practical standpoint is not in excess of the length of shell member 16. It also should be recognized that shell member 16 serves as a convenient member to which the base frame 12 may be affixed (or, as illustrated in FIGURE 5, to which the platform frame 50 may be affixed). Shell 16 sometimes is for convenience termed a "straight second member." It is straight and is a "second member" as distinguished from the main tubular or "first" member.

For reasons as will be evident hereinafter, it is permissible to place a straight stem member 21 in mere abutting contact with the base disc or member 24 of the shell 16. A permanent welded brazed connection is not required inasmuch as the apparatus may be maintained unified together, as generally is desired or even required, by special cable or equivalent means.

The open-ended plunger-receiving section 20 of each main tubular member is, as in the case of the stem-receiving section 15, non-threaded and smooth to receive a plunger 26 slidable in telescoping fashion therewithin. The plunger is received concentrically within the open end of the plunger-receiving section 20; and the plunger-receiving section 20 is preferably free of slots and is preferably (and most economically) of the same tubular character (internal and external diameter) as the remainder of the main tubular element.

Each plunger 26 has a solid abutting-end 27 for contact with the solid ball 23 nearest it within each main tubular member. For lightness in weight with strength for pressure-abutting purposes, and for smooth slidable telescoping operation without binding, these straight plungers 26 are (as in the case of the straight stem sections 21) formed preferably of a hollow tube or pipe. Each is equipped with a solid end such as a cap or plug 27. Lengthwise, plungers 26 (whether unitary or composed of segments) are at least as long as the distance for adjustability to be built into a device made according to the invention (e.g., at least 6 inches of adjustability up to 4 or 5 feet or even 10 or 12 feet, or more, of adjustability being possible). The effective telescoping length of plungers 26 may be very great, depending upon the length of plunger-receiving sections 20 and the length thereof occupied by the plungers.

The external end 28 of plungers 26 (i.e., the end opposite the solid abutting end 27) is in at least abutting contact (or optionally in welded contact or similarly affixed relationship) with a bracket member (39 and 40) carried and moved by means to adjust or change, incrementally, the location of the bracket in a lineal fashion parallel with the straight plungers 26 and parallel with the direction of their longitudinal sliding movement within plunger-receiving sections 20.

Although the particular style of means to effect incremental lineal movement of a bracket member or members—and thereby effect a telescopic shift of the position of plungers 26—is subject to variation, the embodiment giving most reliable and satisfactory operation is as illustrated in FIGURE 2. As there shown, the means for incremental movement is a rotatable shaft member 29, journaled in bearings 30 and 31, which bearings are located in end walls or frame members 32 and 33 of a control box 34. Shaft 29 is equipped with a hand crank 35, or alternatively is equipped with any suitable means to effect rotation thereof as desired. Further, a hand crank may be hinged so as to be collapsible or foldable under the platform of the apparatus; but such a feature is a well-known expedient and is not essential.

Rotatable shaft 29, in the preferred embodiment illustrated, has two screw-threaded portions or sections 36 and 37 in lineal alignment. One portion 36 is equipped with left handed threads, whereas the other 37 is equipped with right handed threads. For stability, the section of the shaft 29 between the screw-threaded portions may be journaled in a bearing held by a center-brace 38 of the control box 34. Upon each threaded portion 36 and 37 is a bracket 39 and 40, respectively, having threads meshing with the threaded portions of control shaft 29 such that each bracket is moved incrementally along the threaded portion of shaft 29 according to the pitch of the threads and the speed of rotation of shaft 29. Further, the movement of the brackets on section 36 and 37 is either toward one another or away from one another during rotation of shaft 29 (clockwise rotation suitably causing the brackets to move together, with elevation of the platform of the apparatus of FIGURES 1 to 4; and counterclockwise rotation causing the reverse of such action). Movement of brackets 39 and 40 in turn causes movement of plungers 26 in each of the plungers-receiving sections 20 of the main tubular member. These plungers in turn act upon balls 23 lineally aligned within each main tubular member ad extending from the solid end 27 of plungers 26 to the solid end 22 of straight stem members 21.

An important feature of the present invention is the essentially uniform joint action between two or more tubular members in effecting elevation and depression of a platform with respect to its base member. It will be noted that the bracket numbered 39, for example, acts jointly upon two plungers identified as 26a and 26b. It effectively causes uniform movement of these plungers in a sliding telescoping fashion within straight-plunger-receiving sections 20a and 20b, respectively. In like manner, bracket 40 acts upon plungers 26 in opposite parallel relationship to plungers 26a and 25b; and comparable uniform movement of all plungers is achieved during rotation of shaft 29 to effect essentially uniform response in each leg section 15 of the main tubular member and thus effect essentially uniform raising and lowering of the platform with respect to its base. This is accomplished with the main control box 34 in an unobtrusive position not readily apparent to an observer. In fact, an on-looker not advised of the mechanism for elevation and lowering of a platform finds it difficult to appreciate exactly what in fact is causing the action.

In all devices, at least two plungers operate respectively within their plunger-receiving sections 20 of main tubular members. In some cases, only a single bracket is used to operate the two plungers; in others, two different oppositely-disposed brackets, carried on oppositely threaded parts of a control shaft, are used. The latter situation in fact may be preferred in cases where pivoting of the platform with respect to the leg portion of the main tubular member is required (and hinged connection is provided to permit such pivoting) during elevation or lowering of only one end of a platform.

At this point it should be pointed out that the net effect of applying pressure upon balls 23, which are in lineal alignment within each main tubular member, is not looked upon as that of causing the balls and plunger and straight stem member to "move" in a train-like fashion through the main tubular member. Rather, the net effect is looked upon as that of causing the main tubular member to move over the lineal train-like alignment of the pressure-bearing elements (i.e., the balls 23, plunger 26 and stem 15). The latter relationship of movement is readily appreciated or seen in the leg section 15 of the apparatus, since that section obviously is moved over the stem 21 and balls 23 during adjustment of the control device. The preferred manner of appreciating the relative movement between parts, however, becomes more obscure in the horizontal portion of the main tubular members (i.e., the portions perpendicular to the leg sections 15). Nevertheless, with respect to the pressure-bearing elements, the main tubular element is looked upon as moving lineally therealong even in the horizontally oriented portion of the main tubular element (as well as in the leg portion thereof). Of course, relative to the platform of FIGURE 1, it is the plungers 26 which are pressed into the horizontal plunger-receiving parts of the main tubular members; but for convenience of understanding operation of the device, it is preferable to look upon the relative movement as that of the tubular member over the pressure-bearing elements.

The significance of the just-noted is possibly not vital except as a basis for ready grasp of the operation of the unification means of this invention. A cable 41, or equivalent (that is, a flexible connector), extends externally to the main tubular members from means functionally associated immovably with one or more plungers 26 (e.g., bracket 39 or 40) to means functionally associated immovably with one or more shells 16 (e.g., the base frame) into which main tubular elements telescope. It is most essential that cable 41 extends substantially parallel to plunger 26 from its affixation to the means assoiated immovably with the plunger (e.g., the bracket) to a point exterior to the plunger-receiving section 20 and in alignment exteriorly therewith. Preferably, the cable 41 extends along, or is essentially lineally aligned with, the main tubular member with which it functions so that, regardless of the position of the main tubular member, the effective distance traversed by the cable in association with a main tubular member during adjustment of the device is constant or remains the same. But this is not critical, since satisfactory unification with adjustability may be attained where the cable, after extending essentially parallel or lineally aligned with plunger 20 to a cable guide aligned externally to the end portion of plunger-receiving sections 20, may proceed directly to the base member (or vice versa, to the platform) along a line essentially parallel or aligned with leg section 15 and shell 16 (but not necessarily adjacent thereto). Each end of the cable is firmly affixed as to the bracket assembly (39 or 40) and to the shell 16 or to equivalent portions of the apparatus immovably connected therewith. Cables extend externally of the internal bore or diameter of the main tubular members. Further, cable-entraining means or guide means, preferably nonrotating, are provided. Such entraining means may comprise a small tubular member 42, or a plurality of spaced tubular members (each tubular guide means being located at a portion of the route taken by the cable where a curve in the direction of the cable is required).

In operation of the device, as bracket members 39 and 40 change in position relative to each other and with respect to the threaded portions of shaft 29, plungers 26 become enveloped (or are moved into or slide into) section 20 of the main tubular member, which in turn causes pressure to be applied upon the lineally aligned balls 23 within the main tubular member and ultimately upon stem 21. This pressure is relieved by movement of the main tubular member upwardly along the lineally aligned train of balls therewithin; and the cable associated externally to the main tubular member provides the very significant benefit of maintaining the platform portion of the apparatus unified with its base frame at all times, regardless of the elevated condition of the platform with respect to the base member.

In FIGURE 5, the significant features of the invention are illustrated in reverse arrangement to that illustrated in FIGURE 1. A control box 34 is shown as mounted or supported upon a base frame 12; and the horizontal section 51 of the main tubular members associated with the control box are also shown as mounted or supported upon the base frame 12. Shell members 16 (and their associated internal straight stem parts not shown in FIGURE 5 but illustrated in FIGURE 4) are part of the platform portion of the adjustable bed apparatus illustrated in FIGURE 5; and the connection of the cable 41 to the shell 16 is near the open end thereof. Bed springs 52 are supported on frame member 53 and in turn support a mattress 54. The entire bed may be equipped for uniform adjustment in level according to the teaching hereof; or, if desired, one or the other or both ends may be so equipped.

The tubular members of the control device hereof are preferably cylindrical (i.e., circular in cross section); however, rectangular tubular members may be employed either in whole or in part with adequate or satisfactory results in some applications. Other modifications for configuration for parts of the control device hereof are also possible without departure from the essence of the teaching set forth herein.

That which is claimed is:

1. A smooth-operating rotatable-ball-containing control device for adjusting the position of an object with respect to a base, said control device having at least one assembly of elements comprising (A) a tubular first member open at both ends with at least one curved portion located intermediate a straight vertically-oriented leg section at one end thereof and a straight horizontally-oriented plunger-receiving section at the other end thereof, (B) a straight vertically-oriented second member having a shell-like configuration into the open end of which said straight leg section of said first member is telescopically engaged, one of said first and second members being mounted on said object and the other of said first and second members being mounted on said base, (C) a stem within said second member and having a solid end received telescopically within the open end of the straight leg section of said first member, (D) a plunger with a solid end telescoping slidably within the straight plunger-receiving section of said first member, (E) a plurality of discrete solid balls in direct abutting pressure-contact and in lineal alignment within said tubular first member between the solid end of said telescoping plunger and the solid end of said telescoping stem, said balls being of a diameter just sufficiently less than the internal diameter of said tubular first member to be received within said tubular first member, said balls further being rotatable with respect to each other within said tubular first member as relative movement takes place between the internal surface of said tubular first member and said lineal alignment of said balls, (F) means for incrementally and slidably advancing and retracting said plunger telescopically within the straight plunger-receiving section of said first member, whereby adjusting the position of said object with respect to said base is effected, and (G) means to maintain said object unified with said base even during adjustment of the position of said object with respect to said base.

2. A smooth-operating rotatable-ball-containing control device for adjusting the position of an object with respect to a base member, said control device comprising (A) a tubular first member open at both ends with at least one curved portion located intermediate a straight leg section at one end thereof and a straight plunger-receiving section at the other end thereof, (B) a straight second member having a shell-like configuration into the open end of which the straight leg section of said first member is telescopically engaged, one of said first and second members being mounted on said object and the other of said first and second members being mounted on said base member, (C) a stem within said second member and having a solid end received telescopically within the open end of the straight leg section of said first member, (D) a plunger with a solid end telescoping slidably within the straight plunger-receiving section of said first member, (E) a plurality of discrete solid balls in direct abutting pressure-contact and in lineal alignment within said tubular first member between the solid end of said telescoping plunger and the solid end of said telescoping stem, said balls being of a diameter just sufficiently less than the internal diameter of said tubular first member to be received within said tubular first member, said balls further being rotatable with respect to each other within said tubular first member as relative movement takes place between the internal surface of said tubular first member and said lineal alignment of said balls, (F) means for incrementally and slidably advancing and retracting said plunger telescopically within the straight plunger-receiving section of said first member, thereby to effect adjustment of the position of said object with respect to said base member, and (G) means for maintaining said object unified with said base member even during adjustment of the position of said object, said means comprising a cable extending externally of said tubular first member and attached at one end to means immovably associated with said plunger and at the other end to means immovably associated with said second member.

3. The device of claim 2 having guide means external to the tubular first member for entraining the cable.

4. A mobile adjustable stretcher having the control device of claim 2 as a part thereof.

5. An adjustable bed having the control device of claim 2 as a part thereof.

6. A smooth-operating rotatable-ball-containing control device for adjusting the position of an object with respect to a base frame while maintaining the object unified with the base frame, said control device comprising (A) a group of at least two tubular first members, each one of said tubular first members being open at both ends with at least one curved portion located intermediate a straight leg section at one end thereof and a straight plunger-receiving section at the other end thereof, (B) a group of at least two straight second members, each one of said straight second members having a shell-like configuration into the open end of which the straight leg section of a first members is telescopically engaged, one group of members being mounted on said object and the other group of members being mounted on said base frame, (C) at least two stems, one within each said second members, each of said stems having a solid end received telescopically within the open end of the straight leg section of a respective first member, (D) at least two plungers, each with a solid end telescoping slidably within the straight plunger-receiving section of a respective first member, (E) a plurality of discrete solid balls in direct abutting pressure-contact and in lineal alignment within each of said tubular first members between the solid end of a telescoping plunger and the solid end of a telescoping stem, the balls in each of said tubular first members being of a diameter just sufficiently less than the internal diameter of their respective tubular first member to be received therewithin, said balls further being rotatable with respect to each other within each of said tubular first members as relative movement takes place between the internal surface of a tubular first member and the lineal alignment of balls therewithin, (F) means for incrementally advancing and retracting said plungers telescopically within the straight plunger-receiving sections of said first members, thereby to effect adjustment of the position of said object with respect to its base frame, and (G) cable means for maintaining said object unified with said base frame even during adjustment of the position of said object.

7. A smooth-operating rotatable-ball-containing control device for adjusting the position of an object with respect to a base frame while maintaining the object unified with the base frame, said control device comprising (A) a group of at least two tubular first members, each one of said tubular first members being open at both ends with at least one curved portion located intermediate a straight leg section at one end thereof and a straight plunger-receiving section at the other end thereof, (B) a group of at least two straight second members, each one of said straight second members having a shell-like configuration into the open end of which the straight leg section of a first member is telescopically engaged, one group of members being mounted on said object and the other group of members being mounted on said base frame, (C) at least two stems, one within each said second members, each of said stems having a solid end received telescopically within the open end of the straight leg section of a respective first member, (D) at least two plungers, each with a solid end telescoping slidably within the straight plunger-receiving section of a respective first member, (E) a plurality of discrete solid balls in direct abutting pressure-contact and in lineal alignment within each of said tubular first members between the solid end of a telescoping plunger and the solid end of a telescoping stem, the balls in each of said tubular first members being of a diameter just sufficiently less than the internal diameter of their respective tubular first member to be received therewithin, said balls further being rotatable with respect to each other within each of said tubular first members as relative movement takes place between the internal surface of a tubular first member and the lineal alignment of balls therewithin, (F) screw means for slidably advancing and retracting said plungers telescopically within the straight plunger-receiving sections of said first members, thereby to effect adjustment of the position of said object with respect to its base frame, and (G) means for maintaining said object unified with said base frame even during adjustment of the position of said object, said means comprising at least two cables external to said tubular first members, each cable being attached at one end to means immovably associated with a plunger for a tubular first member and at the other end to means immovably associated with a straight second member, said cables being entrained by guide means external to said tubular first members such that at least the portion of said cables extending from guide means to attachments associated with plungers is essentially parallel with the path of movement of said plungers.

8. The device of claim 7 wherein the screw means is mounted in parallel offset alignment with the plunger-receiving sections of the first members and carries bracket means operably connected to said plungers for effecting telescoping movement thereof.

9. A smooth-operating rotatable-ball-containing control device for adjusting the position of an object with respect to a base member, said control device comprising (A) a tubular first member open at both ends with at least one curved portion located intermediate a straight leg section at one end thereof and a straight plunger-receiving section at the other end thereof, (B) a second member comprising a stem having a solid end received telescopically within the open end of the straight leg section of said first member, one of said first and second members being mounted on said object and the other of said first and second members being mounted on said base member, (C) a plunger with a solid end telescoping slidably within the straight plunger-receiving section of said first member, (D) a plurality of discrete solid balls in direct abutting pressure-contact and in lineal alignment within said tubular first member between the solid end of said telescoping plunger and the solid end of said telescoping stem, said balls being of a diameter just sufficiently less than the internal diameter of said tubular first member to be received within said tubular first member, said balls further being rotatable with respect to each other within said tubular first member as relative movement takes place between the internal surface of said tubular first member and said lineal alignment of said balls, (E) means for incrementally and slidably advancing and retracting said plunger telescopically within the straight plunger-receiving section of said first member, thereby to effect movement of said balls with respect to said first member and adjustment of the position of said object with respect to said base member, (F) means for maintaining said object unified with said base member even during adjustment of the position of said object with respect to said base member, said means comprising a cable extending externally of said tubular first member and attached at one end to means immovably associated with said plunger and at the other end to means immovably associated with said second member, and (G) means external to said tubular first member for entraining said cable.

10. A smooth-operating rotatable-ball-containing control device for adjusting the position of an object with respect to a base frame while maintaining the object unified with the base frame, said control device comprising (A) a group of at least two tubular first members, each one of said tubular first members being open at both ends with at least one curved portion located intermediate a straight leg section at one end thereof and a straight plunger-receiving section at the other end thereof, (B) a group of at least two second members, each one of said second members comprising a stem received telescopically within the open end of the straight leg section of a respective first member, one of said groups of members being mounted on said object and the other of said groups of members being mounted on said base frame, (C) at least two plungers, each telescoping slidably within the straight plunger-receiving section of a respective first member, (D) a plurality of discrete solid balls in direct abutting pressure-contact and in lineal alignment within each of said tubular first members between a telescoping plunger and a telescoping stem, the balls in each of said tubular first members being of a diameter just sufficiently less than the internal diameter of their respective tubular first member to be received therewithin, said balls further being rotatable with respect to each other within each of said tubular first members as relative movement takes place between the internal surface of a tubular first member and the lineal alignment of balls therewithin, (E) means for incrementally advancing and retracting said plungers telescopically within the straight plunger-receiving sections of said first members, thereby to effect relative movement between said balls and first members, with accompanying adjustment of the position of said object with respect to said base frame, (F) means for maintaining said object unified with said base frame even during adjustment of the position of said object with respect to said base frame, said means comprising at least one cable extending externally to said tubular first members and attached at one end to means immovably associated with at least one of said plungers and at the other end to means immovably associated with at least one of said second members, and (G) guide means external to said tubular first members for entraining said cable at a location intermediate its ends of attachment.

11. The control device of claim 10 wherein the means (E) for incrementally advancing and retracting said plungers telescopically within the straight plunger-receiving sections of said first members comprises a screw member, and wherein the means (F) for maintaining said object unified with said base frame even during adjustment of the position of said object with respect to said base frame comprises at least two cables, each extending externally to said tubular first members, and each being attached at one end to means immovably associated with plungers for tubular first members and at the other end to means immovably associated with said second members, each said cable being entrained by a guide means external to said tubular first members such that at least the portion of each of said cables which extends from the guide means to attachments associated with said plungers is essentiallly parallel with the path of movement of said plungers.

12. The device of claim 10 wherein the means (E) for incrementally advancing and retracting said plungers telescopically within the straight plunger-receiving sections of said first members comprises a screw member mounted in parallel offset alignment with the plunger-receiving sections of the first members and carrying bracket means operably connected to said plungers for effecting telescoping movement thereof.

References Cited by the Examiner

UNITED STATES PATENTS

| | | | |
|---|---|---|---|
| 1,692,444 | 11/1928 | Hirschl | 254—98 |
| 1,807,914 | 6/1931 | Hopkins | 254—98 |
| 2,017,300 | 8/1935 | Wiesman | 254—98 |
| 2,212,488 | 8/1940 | Bell | 108—147 |
| 2,721,106 | 8/1955 | Chaney | 108—147 |
| 2,774,079 | 12/1956 | Flatley | 5—63 X |
| 2,830,303 | 4/1958 | Sandock | 5—63 |
| 2,999,729 | 9/1961 | Semmelroth | 108—146 |
| 3,080,835 | 3/1963 | Guglielmi | 108—147 X |
| 3,105,246 | 8/1963 | Emrick | 5—63 |
| 3,117,392 | 1/1964 | Junkunc | 108—144 X |

FOREIGN PATENTS

| | | |
|---|---|---|
| 1,176,177 | 11/1958 | France. |
| 648,203 | 1/1951 | Great Britain. |

FRANK B. SHERRY, *Primary Examiner.*

J. T. McCALL, *Assistant Examiner.*